(12) United States Patent
Fang et al.

(10) Patent No.: US 12,449,577 B2
(45) Date of Patent: Oct. 21, 2025

(54) BROADBAND INFRARED ABSORBER BASED ON EPSILON-NEAR-ZERO MATERIAL

(71) Applicant: Anhui University, Hefei (CN)

(72) Inventors: Ming Fang, Hefei (CN); Chenran Liu, Hefei (CN); Meijun Kang, Hefei (CN); Ke Xu, Hefei (CN); Jian Feng, Hefei (CN); Zhicheng Xiao, Hefei (CN); Rongsheng Cheng, Hefei (CN); Xingchen Liu, Hefei (CN); Zhixiang Huang, Hefei (CN)

(73) Assignee: Anhui University, Anhui (CN)

( * ) Notice: Subject to any disclaimer, the term of this patent is extended or adjusted under 35 U.S.C. 154(b) by 432 days.

(21) Appl. No.: 18/059,354

(22) Filed: Nov. 28, 2022

(65) Prior Publication Data
US 2023/0106637 A1    Apr. 6, 2023

(30) Foreign Application Priority Data
Nov. 29, 2021 (CN) .......................... 202111429946.6

(51) Int. Cl.
*G02B 5/20* (2006.01)

(52) U.S. Cl.
CPC .................... *G02B 5/208* (2013.01)

(58) Field of Classification Search
CPC .......... G02B 5/208; G02B 5/22; G02B 5/003; G02B 5/20; H05K 9/0088; H05K 9/00
See application file for complete search history.

(56) References Cited

U.S. PATENT DOCUMENTS

| | | | |
|---|---|---|---|
| 2012/0170097 A1* | 7/2012 | Han | B82Y 20/00 977/932 |
| 2015/0276489 A1* | 10/2015 | Cumming | G01J 5/58 250/338.3 |
| 2017/0031183 A1* | 2/2017 | Han | G02F 1/0102 |
| 2018/0323512 A1* | 11/2018 | Hong | H01Q 17/008 |
| 2019/0339418 A1* | 11/2019 | Sirbuly | G03F 7/0015 |
| 2021/0199570 A1* | 7/2021 | Swett | G01J 5/20 |
| 2022/0283341 A1* | 9/2022 | Raksha | H01Q 15/0086 |

FOREIGN PATENT DOCUMENTS

| | | |
|---|---|---|
| CN | 104316169 A | 1/2015 |
| CN | 111883935 A | 11/2020 |

* cited by examiner

*Primary Examiner* — Balram T Parbadia

(57) ABSTRACT

Described is a broadband near infrared absorber, including a wide-type cross-shaped gold layer, an indium tin oxide (ITO) thin film, a silicon dioxide ($SiO_2$) layer and a hollowed-out cross-shaped gold layer arranged from top to bottom. A length of the cross-shaped gold layer is the same as a length of the hollowed-out cross-shaped gold layer. A width of the cross-shaped gold layer is the same as a width of the hollowed-out cross-shaped gold layer. A thickness of the cross-shaped gold layer is different from a thickness of the hollowed-out cross-shaped gold layer.

9 Claims, 2 Drawing Sheets

BROADBAND INFRARED ABSORBER BASED ON EPSILON-NEAR-ZERO MATERIAL

CROSS-REFERENCE TO RELATED APPLICATIONS

This application claims the benefit of priority from Chinese Patent Application No. 202111429946.6, filed on Nov. 29, 2021. The content of the aforementioned application, including any intervening amendments thereto, is incorporated herein by reference in its entirety.

TECHNICAL FIELD

The present application relates to electromagnetic wave and metamaterials, and more particularly to a broadband near infrared absorber.

BACKGROUND

In recent years, the near infrared has broad application in many fields such as materials, chemistry, medicine and radar. The development of near infrared radiation sources and detectors greatly improves the researches on the theory and application of near infrared radiation. The traditional near infrared absorbing materials have low absorptance, narrow absorption band and large size. With the development of electromagnetic wave technology and the further research of electromagnetic compatibility, there has been a great breakthrough in absorbing materials. The broadband absorbing materials are manufactured by selecting suitable medium layer according to the electromagnetic design requirements.

SUMMARY

Accordingly, the present invention provides a broadband near infrared absorber, which has a broad frequency band, an absorption rate of more than 90%, a simple structure, a small size and convenient manufacture, and can be applied to many fields such as materials, chemistry, medicine and radar.

Technical solutions of this application are specifically described as follows.

Described is a broadband near infrared absorber, comprising:
  a top cross-shaped gold layer;
  a medium layer; and
  a bottom hollowed-out cross-shaped gold layer;
  wherein a length of the top cross-shaped gold layer is the same as a length of the bottom hollowed-out cross-shaped gold layer; a width of the top cross-shaped gold layer is the same as a width of the bottom hollowed-out cross-shaped gold layer; a thickness of the top cross-shaped gold layer is different from a thickness of the bottom hollowed-out cross-shaped gold layer; and the medium layer is made of a material having high broadband absorption in a near infrared band.

In some embodiments, the medium layer comprises an indium tin oxide (ITO) thin film and a silicon dioxide ($SiO_2$) layer; and the ITO thin film is arranged close to the top cross-shaped gold layer.

In some embodiments, a thickness of the ITO thin film is 20-40 nm; and a width of the ITO thin film is 400-500 nm.

In some embodiments, the thickness of the ITO thin film is 30 nm; and the width of the ITO thin film is 460 nm.

In some embodiments, a thickness of the $SiO_2$ layer is 150-250 nm.

In some embodiments, the thickness of the $SiO_2$ layer is 200 nm.

In some embodiments, the length of the top cross-shaped gold layer is 250-350 nm; the width of the top cross-shaped gold layer is 150-250 nm; the thickness of the top cross-shaped gold layer is 10-60 nm; and the thickness of the bottom hollowed-out cross-shaped gold layer is 30-150 nm.

In some embodiments, the length of the top cross-shaped gold layer is 300 nm; the width of the top cross-shaped gold layer is 190 nm; the thickness of the top cross-shaped gold layer is 40 nm; and the thickness of the bottom hollowed-out cross-shaped gold layer is 110 nm.

In some embodiments, the broadband near infrared absorber has a nanoscale size.

In some embodiments, the top cross-shaped gold layer, the bottom hollowed-out cross-shaped gold layer and the ITO thin film are set in accordance with a Drude model parameter.

Compared to the prior art, the application has the following beneficial effects.

The broadband near infrared absorber provided herein has broadband hand high absorption, which includes a wide cross-shaped gold layer, the ITO thin film, the $SiO_2$ layer and a hollowed-out cross-shaped gold layer arranged from top to bottom. By adjusting a size of each layer, the near infrared absorber can achieve broadband absorption with a bandwidth of more than 400 nm and an absorption rate of more than 90% in a wavelength range of 1530-1950 nm.

The broadband near infrared absorber provided herein has simple structure, and only needs simple rotation and model size increase and decrease to achieve the desired results when debugging.

BRIEF DESCRIPTION OF THE DRAWINGS

The present disclosure will be described below with reference to the accompany drawings to facilitate the understanding. Obviously, the accompany drawings described below are merely some embodiments of the present disclosure, which are not intended to limit the disclosure.

DETAILED DESCRIPTION OF EMBODIMENTS

The present disclosure will be described in detail below with reference to the embodiments and accompanying drawings to make objects, features and advantages of the present disclosure more apparent. Obviously, described below are merely some embodiments of this disclosure, and are not intended to limit the disclosure. Other embodiments obtained by those skilled in the art based on the embodiments provided herein without paying any creative effort should fall within the scope of the present disclosure.

Technical solutions of the present disclosure will be completely described below with reference to the embodiments and accompanying drawings.

Figure 1:
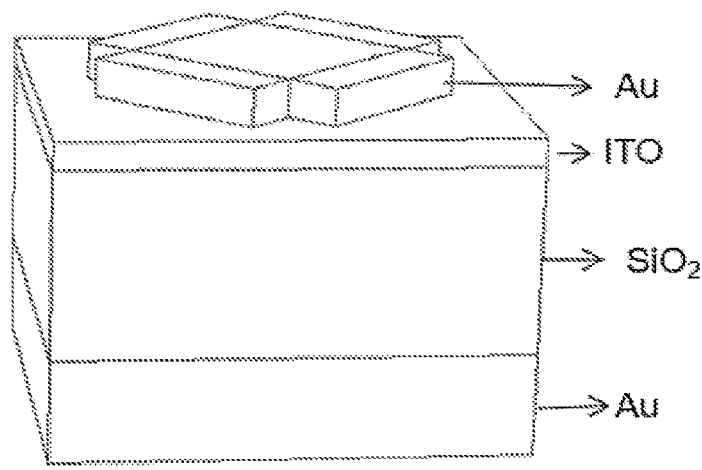
FIG. 1 schematically depicts a structure of a broadband near infrared absorber according to an embodiment of the present disclosure.
Figure 2:
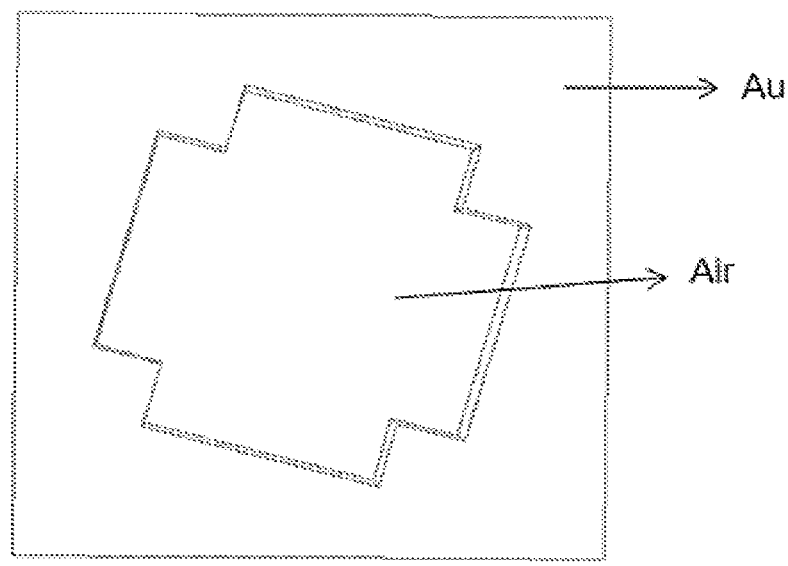
FIG. 2 shows a bottom of the broadband near infrared absorber shown in FIG. 1.

Provided herein is a broadband near infrared absorber, which requires a single resonance unit to realize a desired wave absorption property, that is, the broadband near infrared absorber merely includes one absorbing resonance unit. Referring to FIG. 1, the broadband near infrared absorber includes a top cross-shaped gold layer, an ITO thin film, a $SiO_2$ layer and a bottom hollowed-out cross-shaped gold layer arranged from top to bottom. A length of the top cross-shaped gold layer is the same as a length of the bottom hollowed-out cross-shaped gold layer. A width of the top cross-shaped gold layer is the same as a width of the bottom hollowed-out cross-shaped gold layer. A thickness of the top cross-shaped gold layer is different from a thickness of the bottom hollowed-out cross-shaped gold layer. By adjusting a size of each layer, the broadband near infrared absorber provided herein can satisfy desired objects.

In an embodiment, the broadband near infrared absorber has a nanoscale size. Due to such small size, the top cross-shaped gold layer, the bottom hollowed-out cross-shaped gold layer and the ITO thin film are set in accordance with a Drude model parameter.

In an embodiment, a thickness of the ITO thin film is 20-40 nm. A width of the ITO thin film is 400-500 nm. A thickness of the $SiO_2$ layer is 150-250 nm. The length of the top cross-shaped gold layer is 250-350 nm. The width of the top cross-shaped gold layer is 150-250 nm. The thickness of the top cross-shaped gold layer is 10-60 nm. The thickness of the bottom hollowed-out cross-shaped gold layer is 30-150 nm.

Figure 3:
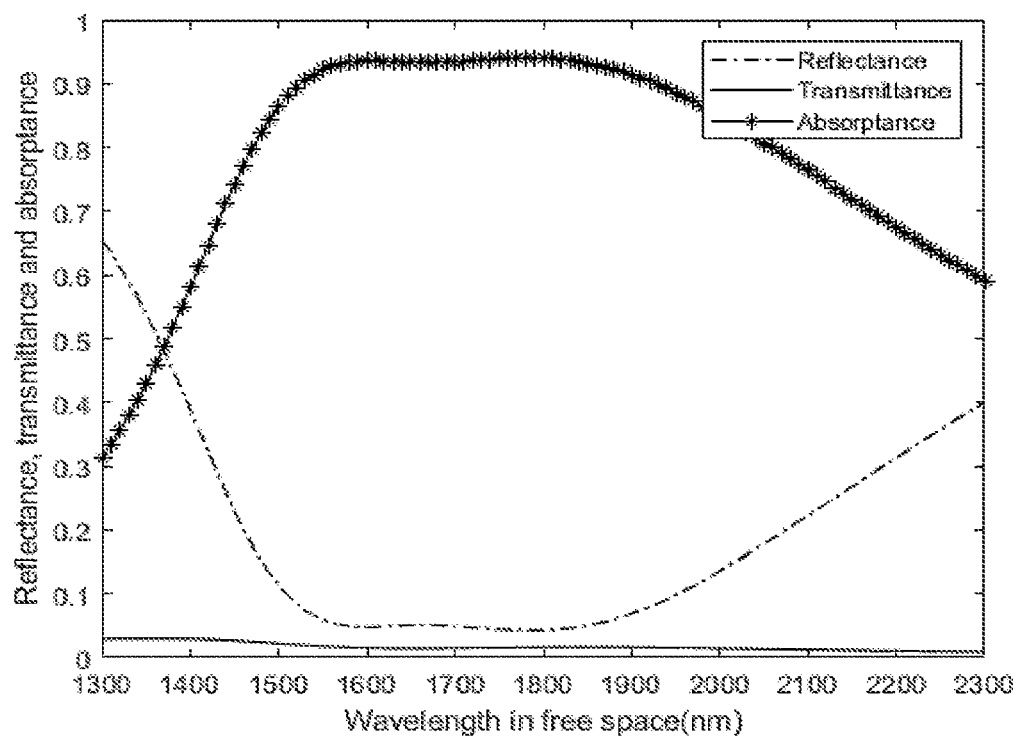
FIG. 3 is a resonance curve of the broadband near infrared absorber according to an embodiment of the present disclosure.
Figure 4:
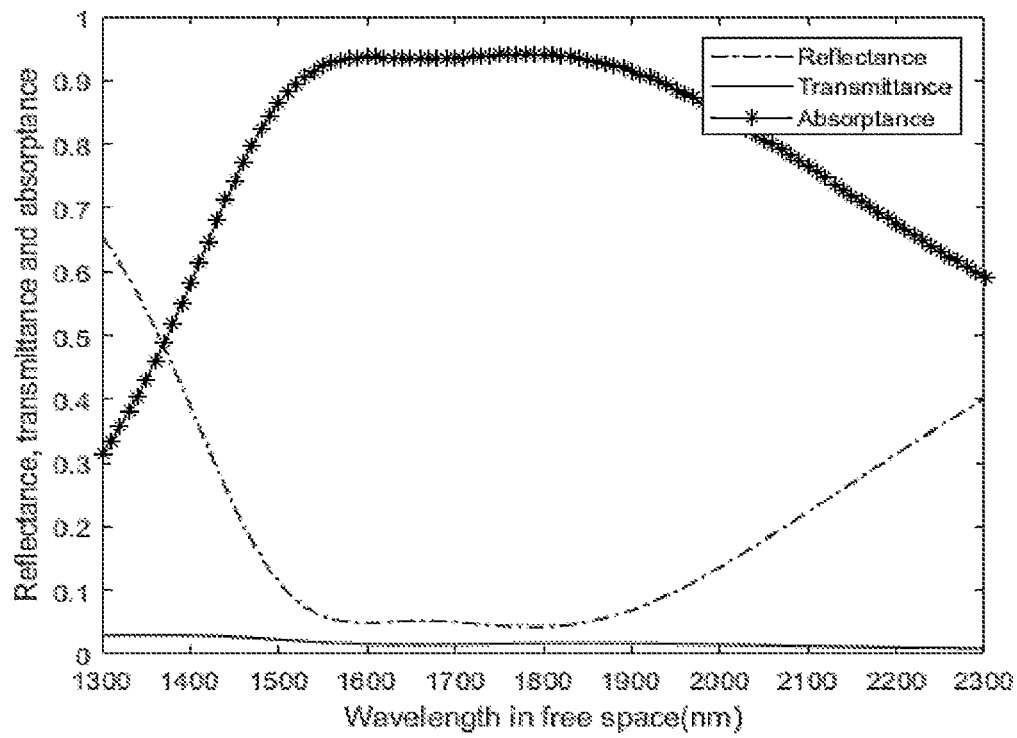
FIG. 4 is a simulated absorption curve of the broadband near infrared absorber according to an embodiment of the present disclosure.

In an embodiment, the length of the top cross-shaped gold layer is 300 nm. The width of the top cross-shaped gold layer is 190 nm. The thickness of the top cross-shaped gold layer is 40 nm. The thickness of the ITO thin film is 30 nm. The thickness of the $SiO_2$ layer is 200 nm. The thickness of the bottom hollowed-out cross-shaped gold layer is 110 nm. Regarding this broadband near infrared absorber, a simulated absorption curve thereof is shown in FIG. 3. By adjusting a rotation angle of the top cross-shaped gold layer and the bottom hollowed-out cross-shaped gold layer, a broadband of the broadband near infrared absorber will be affected. By rotating the top cross-shaped gold layer 45 degrees to the right, and rotating the bottom hollowed-out cross-shaped gold layer 15 degrees to the right, a frequency bandwidth of the broadband near infrared absorber is improved, and an absorption curve is shown in FIG. 4. Therefore, a near infrared absorption curve with an absorption rate of more than 90% in a broadband of 1530-1950 nm is achieved.

The ITO is prepared as follows.

$In(NO_3)_3 \cdot 5H_2O$ and $SnCl_4 \cdot 5H_2O$ were employed as inorganic reactants, citric acid was employed as a complexing agent, ethylene glycol was employed as a polymerization agent, and double distilled water and absolute ethyl alcohol were employed as dispersion solvents to prepare ITO nano-particles.

Preparation of ITO Nano-Particles by Polycarbonate (PC) Sol-Gel Method (S1) $In(NO_3)_3 \cdot 5H_2O$ and $SnCl_4 \cdot 5H_2O$ were dissolved in a solution having double distilled water and absolute ethyl alcohol to obtain a mixed solution, where $In(NO_3)_3 \cdot 5H_2O$, $SnCl_4 \cdot 5H_2O$, double distilled water and absolute ethyl alcohol have the same part by weight.

(S2) The mixed solution was added with citric acid and ethylene glycol, and stirred for 40 min at 40° C.

(S3) The mixed solution was subjected to reflux at 120° C. for 3 h to obtain a sol.

(S4) The sol was slowly heated in an open oil bath with a temperature of 90° C. for 18 h to obtain a wet gel.

(S5) The wet gel was directly heated at 140° C. for 4 h.

(S6) The wet gel was dried at 200° C. for 30 min to obtain a dry gel.

(S7) The dry gel was annealed in a natural air tank at 350° C. for 1 h, and cooled to room temperature, so as to obtain the ITO nano-particles.

Coating by Using Magnetron Sputtering According to Principle of Cathode Sputtering $SiO_2$ was adopted as a substrate. Particles were originated from the glow discharge. The argon ions were employed to perform cathode sputtering on cathodic ITO targets. The argon ions implemented sputtering to target atoms, such that the target atoms can freely fly away. Then the target atoms deposited onto a surface of the substrate to form the desired ITO thin film.

Compared to the prior art, the present disclosure has the following beneficial effects.

(1) The broadband near infrared absorber provided herein has small size and regular shape, and is easy to process.

(2) According to experimental measurements, modifying the size can change a working frequency range of the broadband near infrared absorber. Therefore, the broadband near infrared absorber can be applied as a broadband absorber for multiple frequency bands.

The embodiments are described in a progressive manner. The same and similar parts of each embodiment can be referred to each other, and the difference between each embodiment and other embodiments is emphasized. In particular, for the product embodiment, since it is basically similar to the method embodiment, the description is relatively simple, and the relevant part can be referred to the description of the method embodiment.

Described above are merely illustrative of the disclosure, and are not intended to limit the disclosure. It should be understood that any modifications, replacements and improvements made by those skilled in the art based on the content disclosed herein without departing from the scope of the disclosure shall fall within the scope of the present disclosure defined by the appended claims.

What is claimed is:

1. A broadband near infrared absorber, comprising:
a top cross-shaped gold layer;
a medium layer; and
a bottom hollowed-out gold layer;
wherein a length of the top cross-shaped gold layer is the same as a length of the bottom hollowed-out gold layer; a width of the top cross-shaped gold layer is the same as a width of the bottom hollowed-out gold layer; a thickness of the top cross-shaped gold layer is different from a thickness of the bottom hollowed-out gold layer; and the medium layer is made of a material having high broadband absorption in a near infrared band; and
the bottom hollowed-out gold layer comprises a cross-shaped opening; the medium layer comprises an indium tin oxide (ITO) thin film and a silicon dioxide ($SiO_2$) layer; the top cross-shaped gold layer, the ITO thin film, the $SiO_2$ layer, and the bottom hollowed-out gold layer are arranged in sequence; and the top cross-shaped gold layer is directly disposed on the ITO thin film.

2. The broadband near infrared absorber of claim 1, wherein a thickness of the ITO thin film is 20-40 nm; and a width of the ITO thin film is 400-500 nm.

3. The broadband near infrared absorber of claim 2, wherein the thickness of the ITO thin film is 30 nm; and the width of the ITO thin film is 460 nm.

4. The broadband near infrared absorber of claim 1, wherein a thickness of the $SiO_2$ layer is 150-250 nm.

5. The broadband near infrared absorber of claim 4, wherein the thickness of the $SiO_2$ layer is 200 nm.

6. The broadband near infrared absorber of claim 1, wherein the length of the top cross-shaped gold layer is 250-350 nm; the width of the top cross-shaped gold layer is 150-250 nm; the thickness of the top cross-shaped gold layer is 10-60 nm; and the thickness of the bottom hollowed-out gold layer is 30-150 nm.

7. The broadband near infrared absorber of claim 6, wherein the length of the top cross-shaped gold layer is 300 nm; the width of the top cross-shaped gold layer is 190 nm; the thickness of the top cross-shaped gold layer is 40 nm; and the thickness of the bottom hollowed-out gold layer is 110 nm.

8. The broadband near infrared absorber of claim 1, wherein the broadband near infrared absorber has a nanoscale size.

9. The broadband near infrared absorber of claim 1, wherein the top cross-shaped gold layer, the bottom hollowed-out gold layer and the ITO thin film are set in accordance with a Drude model parameter.

\* \* \* \* \*